March 5, 1968 A. J. TOTI 3,371,701
FOLDABLE PANEL STRUCTURE AND METHOD OF ASSEMBLY
Filed Oct. 22, 1965 3 Sheets-Sheet 1

INVENTOR.
ANDREW J. TOTI
BY
Boyken, Mohler, Foster & Schlemmer
ATTORNEYS

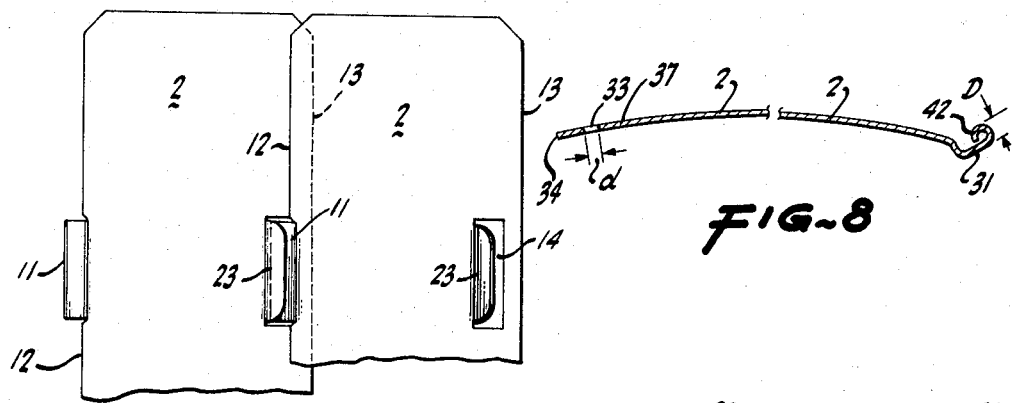
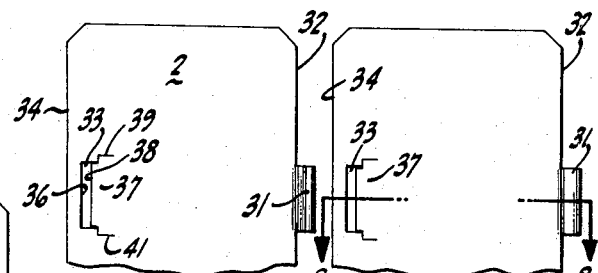
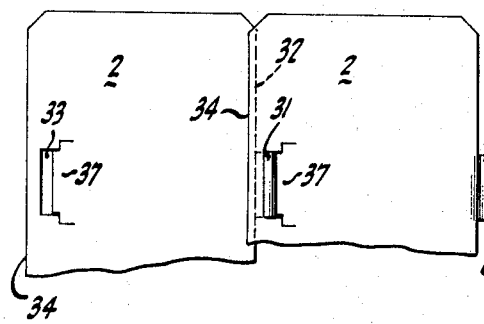
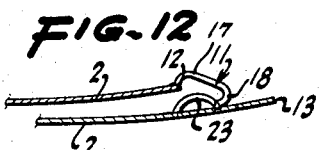
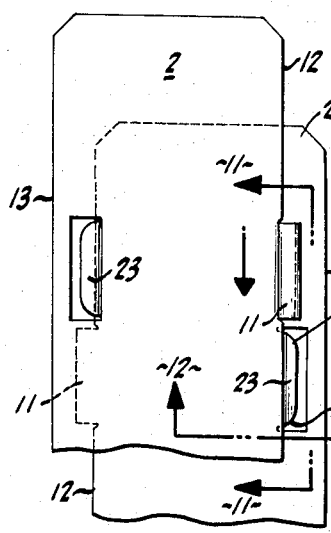
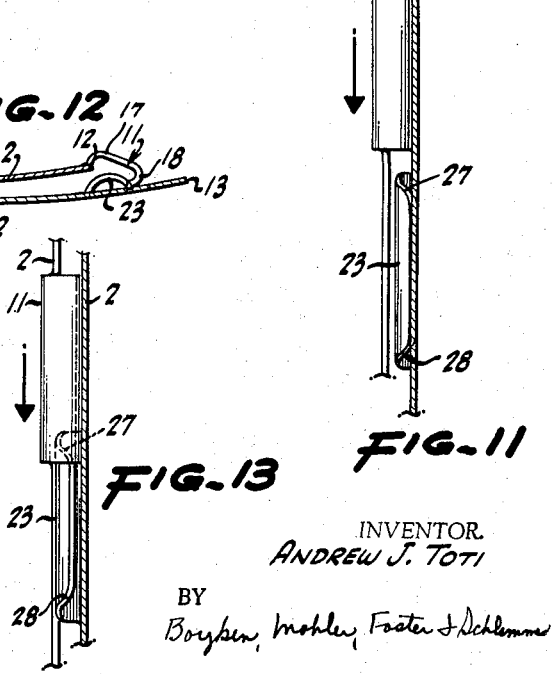

March 5, 1968 A. J. TOTI 3,371,701
FOLDABLE PANEL STRUCTURE AND METHOD OF ASSEMBLY
Filed Oct. 22, 1965 3 Sheets-Sheet 3
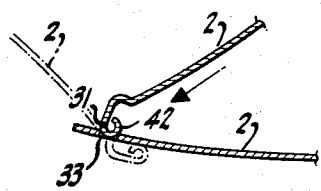
FIG-14
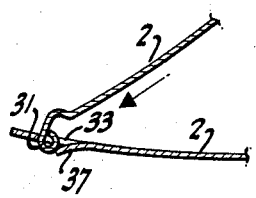
FIG-15
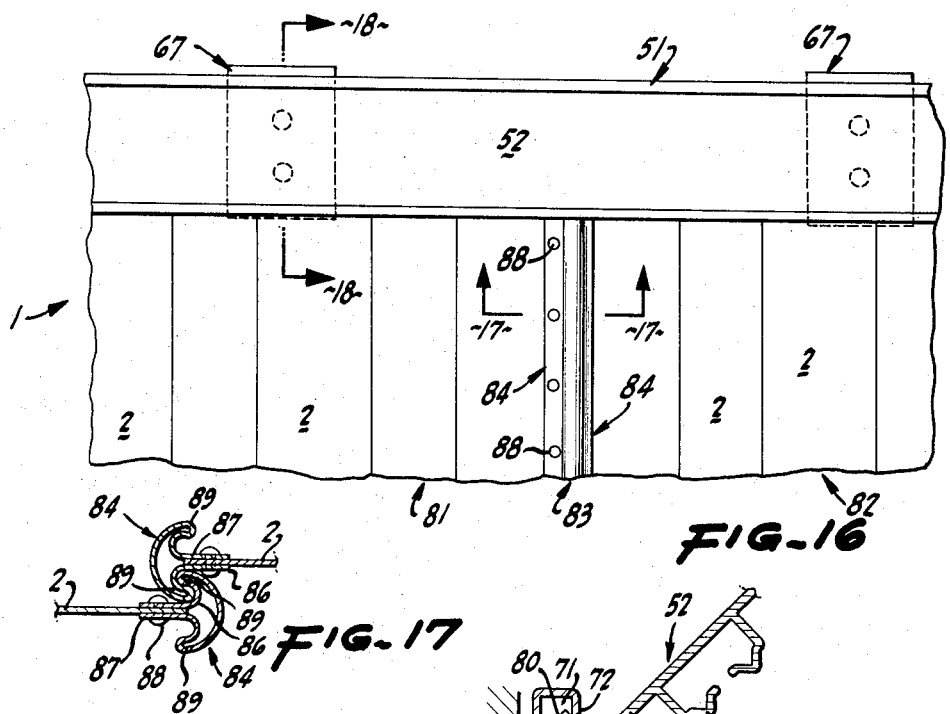
FIG-16
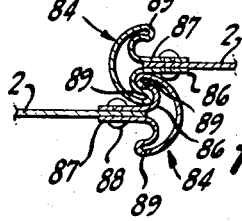
FIG-17
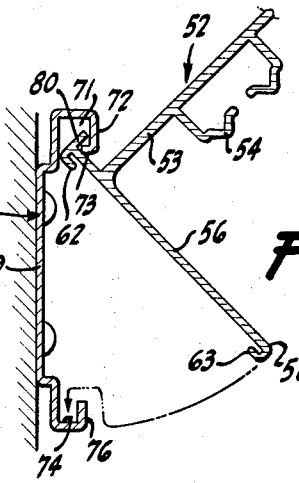
FIG-19
FIG-18
INVENTOR.
ANDREW J. TOTI
BY
Boykin, Mohler, Foster & Schlemmer
ATTORNEYS

# United States Patent Office 3,371,701
Patented Mar. 5, 1968

3,371,701
FOLDABLE PANEL STRUCTURE AND
METHOD OF ASSEMBLY
Andrew J. Toti, 311 W. River Road,
Modesto, Calif. 95351
Filed Oct. 22, 1965, Ser. No. 501,184
18 Claims. (Cl. 160—235)

ABSTRACT OF THE DISCLOSURE

An accordion foldable panel structure and method of assembling the same. The structure is defined by a series of hingedly interconnected panels in which the hinges between adjacent panels are formed integral with the panels so that separate hinge structures are not required. The hinges comprise enlarged tongues on one panel received directly in slots in an adjacent panel. The dimension of each tongue is such that it may not be removed under normal conditions from an associated slot.

---

This invention relates generally to a foldable panel structure and to its method of assembly. More particularly, this invention relates to a panel structure which is expansible and retractable by unfolding or folding the same in accordion fashion. Still more particularly, this invention relates to an accordion foldable traverse panel structure in which the panels which define the structure are hingedly connected with each other along their adjacent edges by integral hinge means so that the need for separate hinge constructions is obviated.

This invention further relates to improved hinge means formed directly from the material of adjacent panels interconnected thereby, and to a simple and novel panel assembly method made possible by the improved nature of such integral hinge means. This invention also relates to means for interconnecting separate sections of a panel structure to maintain the structure in an expanded condition, and to means for supporting the panel structure in an operative position for traverse folding and unfolding.

The improved hinge means of this invention is defined by at least one and preferably a series of equally spaced tongues integrally provided along a longitudinal edge of one panel which project from such edge and are hingedly received directly in a corresponding number of slots which are correspondingly spaced along a longitudinal edge of an adjacent panel. In this connection, the hinge means disclosed herein is an improved construction over the integral hinge means illustrated and described in my Patent No. 3,196,931 dated July 27, 1965, entitled "Expansible and Retractable Panel Structure."

In general respects the hinge means of my patent and the hinge means disclosed herein are similar in that each each is defined by interconnected tongues and slots formed directly from the material of the panels being interconnected thereby so that separate hinge constructions are not required. Furthermore, in each instance the tongues are provided with enlarged portions thereon which, under normal circumstances, preclude movement of the tongues through associated slots from one side of a panel to the other side thereof to effect hinged interconnection of adjacent panels.

The enlarged portions of the tongues of my patented structure are defined by projections formed on the tongues which extend longitudinally thereof. As described in my patent, such tongue projections provide the tongues with an overall longitudinal dimension which is greater than the maximum longitudinal dimension of the slot in which such tongue is to be received. To permit interengagement of the tongues and slots of my patented structure, the slots are each formed sufficiently wide so that the maximum diagonal dimension of the slot is sufficient to accommodate a tongue therethrough when the tongue is bias oriented relative to the longitudinal axis of the slot.

While the construction of my patent is a highly desirable and effective improvement over the art known theretofore, the bias insertion required for the hinge means thereof presents certain assembly problems which are obviated by the hinge means of the present invention. That is, the improved hinge means of this invention does not require bias tongue and slot interengagement which is characteristic of the assembly method of the structure of my patent. Thus an extremely simple and rapid assembly method is made possible by the simplified and improved hinge means of this invention.

To distinguish this invention from the invention of my patent in which bias interengagement of the tongues and slots is employed, hereinafter reference is made to a snap lock type interconnection or interengagement of the tongues and slots of the hinge means hereof. Such snap lock interengagement, depending upon the particular embodiment of the hinge means being utilized, may be accomplished either by moving adjacent panels longitudinally or laterally relative to each other, as will be described in greater detail hereinafter.

The panel structure of this invention is highly effective for its intended purpose and such panel structure produces not only those advantages listed hereinafter which are attributable to the improved construction of this invention, but also those advantages set out in my patent for the panel structure disclosed therein. To obviate the need for bias interengagement of the hinge means of this invention, each slot is provided with resilient means which permits temporary enlargement of the slot so that an enlarged portion of an associated tongue may be inserted through the slot from one side of a panel to the other, with the slot thereafter returning to its normal dimension to maintain the tongue therein. With this invention, each tongue enlarged portion is formed in a direction which extends generally transversely of the axes of the panels being interconnected, rather than longitudinally of such axes as was the case with the panel structure of my patent.

The resilient means provided in conjunction with each slot which permits temporary enlargement thereof is provided by a bendable tab which defines one longitudinal margin of the slot. The marginal edge of such tab is spaced from the opposed longitudinal margin of the slot a distance which is normally less than the maximum dimension of the tongue enlarged portion so that such enlarged portion cannot pass through the slot without distortion of the tab. After such distortion is temporarily effected, the tab resiliently returns to its normal position to retain the enlarged portion of the tongue interengaged with the slot so that accidental separation of the panels thus interconnected is positively precluded.

In addition to the improved hinge means of this invention other novel features presented hereby include means for supporting an assembled panel structure in an operative position, and means for interconnecting cooperable sections of a panel structure to maintain the sections in an expanded position as desired.

From the foregoing it should be understood that objects of this invention include the provision of an improved expansible and retractable accordion foldable panel structure; the provision in such a panel structure of improved hinge means formed integral with adjacent panels being interconnected thereby; the provision of tongue and slot type hinge means which are formed directly from the material of adjacent panels interconnected thereby; the provision of a simple assembly method for hingedly interconnecting adjacent panels of a panel structure; the provision of means for supporting a panel structure relative to a reference area to be covered thereby; and the provision of means for interconnecting cooperable sections of a panel structure when such sections are expanded to close off a reference area.

These and other objects and advantages of this invention will become apparent from a study of the following disclosure. In this regard, advantages of a panel structure which utilizes integral hinges are set out in detail in my aforementioned patent, as are illustrative uses for such a panel structure. Accordingly, reference also is directed to such patent for a statement of such advantages and uses. That is, it should be appreciated that the panel structure of this invention has inherent therein the important advantages of the structure of my patent, along with the additional advantages produced by the novel features disclosed herein.

In the attached drawings a foldable traverse drape or window covering is illustrated but it should be understood, of course, that the structure of this invention is utilizable in a variety of other installations, for example, as a foldable room divider, door or the like. Similarly, the size of the structure may be varied to meet particular needs and, in this regard, the length and width of individual panels employed therewith may be varied as required without departing from the scope of this invention.

So that the cost of the subject panel structure may be held to a minimum, it is preferred that the structure be built up from a plurality of substantially identical panels. To permit such identical panels to be employed, adjacent panels in the structure need merely be oppositely oriented in an end-for-end relationship to bring the slots along one edge of one panel into alignment with the tongues along an adjacent edge of an adjacent panel. Thus special filler panels of special construction are not required with this invention.

In the accompanying drawings:

FIG. 6 is a plan view corresponding generally to FIG. 4 but showing the hinge means of the adjacent panels interconnected.

FIGS. 7, 8 and 9 are views corresponding generally to FIGS. 4, 5 and 6 which show details of a modified hinge means employable in a panel structure of this invention.

FIG. 10 is a plan view showing two panels having the hinge construction of FIGS. 4–6 prior to longitudinal slidable snap lock interconnection thereof.

FIGS. 11 and 12 are sectional views taken in the planes of lines 11—11 and 12—12 respectively of FIG. 10.

FIG. 13 is a sectional view taken generally in the plane of line 11—11 of FIG. 10 but showing the tongue and slot of adjacent panels partially interconnected.

FIG. 14 is a sectional view through two panels having the modified hinge construction shown in FIG. 7 through 9 which illustrates their preferred orientation during snap lock assembly thereof.

FIG. 15 is a view corresponding generally to FIG. 14 but showing the manner in which the enlarged portion of a tongue is receivable through a slot during temporary distortion of the slot.

FIG. 16 is a front elevational view showing a panel structure comprised of two separate sections, and the supporting means therefor.

FIG. 17 is a horizontal sectional view taken in the plane of line 17—17 of FIG. 16 showing means for temporarily interconnecting the two sections of the panel structure.

FIG. 18 is a vertical section taken through the supporting means of this invention taken in the plane of line 18—18 of FIG. 16.

FIG. 19 is a view corresponding generally to FIG. 18 but showing the method of interengagement of the components of the supporting means of this invention.

Figure 1:
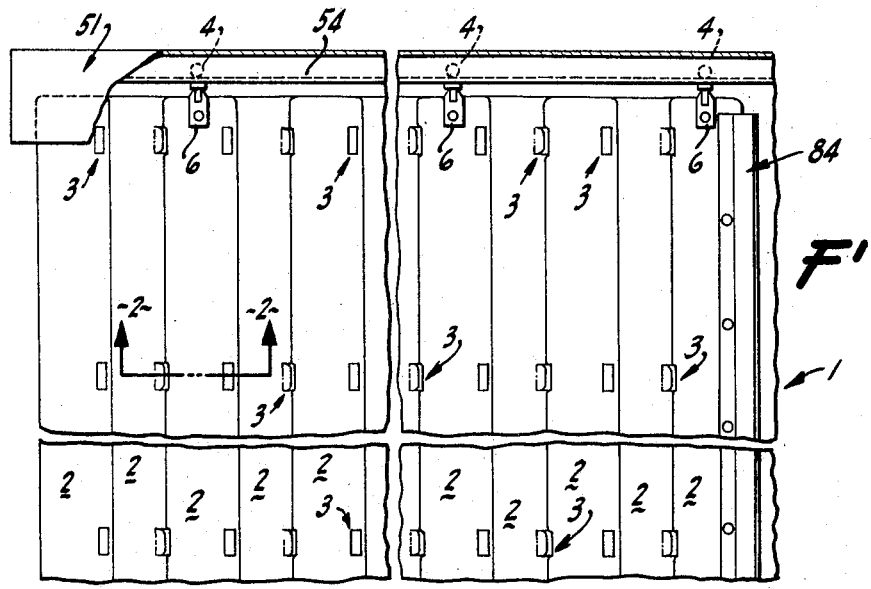
FIG. 1 is a front elevational view of a panel structure of this invention illustrating the panels thereof traversed to an expanded or closed position.

As seen in FIG. 1, the panel structure of this invention comprises a panel assembly, generally designated 1, which includes a series of foldably interconnected elongated slats or panels 2, each of which is hingedly connected with an adjacent panel by hinge means, generally designated 3, formed directly from the material of the panels interconnected thereby so that separate hinge constructions are completely unnecessary. The panel assembly may be made up of only one section of panels of sufficient size to completely traverse across window opening or like reference area to be closed off thereby. Alternatively, two or more separate cooperable panel sections may be employed to close off such an opening. When more than one panel section is employed, means for interconnecting such panels to maintain the same in their expanded positions may be provided, as will be described hereinafter.

The panel structure is provided at its upper end with slidable means cooperable with the supporting means of this invention to maintain the structure in its operative position. Such means, as seen in FIG. 1, comprise slide members 4 (or roller members, if preferred) pivotally connected with associated panels by means of links 6 riveted, pinned or otherwise suitably secured adjacent the top edges of associated panels. It should be understood that it is not necessary to provide each panel of the assembly with a slide and link construction in that the hinge means between adjacent panels provide support for any panels not provided with slide members 4. Thus, slide members may be provided on alternate panels, or on other sequentially spaced panels as may be found desirable. The number of slide members employed for a given panel structure will be determined primarily by the size of the structure.

Figure 2:
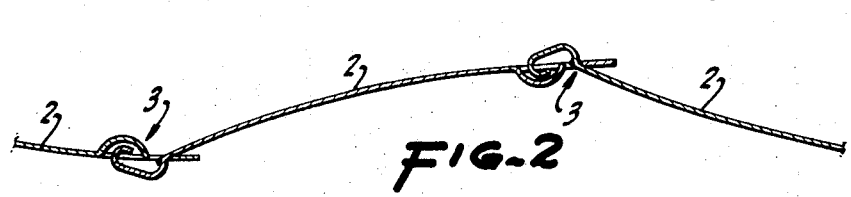
FIG. 2 is a horizontal sectional view through the expanded panel structure of FIG. 1 taken in the plane of line 2—2 thereof.
Figure 3:
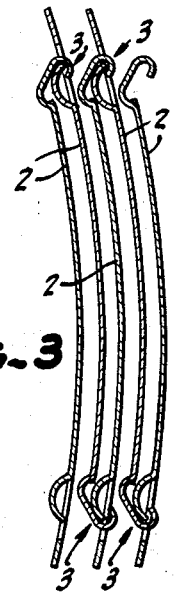
FIG. 3 is a horizontal sectional view through the panel structure showing the panels thereof compactly folded in the retracted position.

As will be described hereinafter, slide members 4 are to be engaged with a traverse track of the supporting means in known fashion so that the panel structure may be moved in accordion fashion from a retracted position to an expanded position, and vice versa, as seen in FIGS. 2 and 3. Use herein of the term "accordion folding" means that alternate panels of the structure are foldable in opposite directions relative to a median vertical reference plane so that the structure when viewed from either side has the general appearance of the bellows of an accordion, particularly when the structure is retracted or partially retracted.

It should be understood that the number of panels required to cover or close off, when extended, a given reference opening will be determined primarily by the width of the individual panels. Because there is only a very small amount of overlap between edges of adjacent panels, the expanded width of a panel structure is determined primarily by the combined widths of the panels making up that structure. In this regard, and by way of illustration, it should be obvious that only half as many four inch wide panels are required to cover a given opening as would be required if two inch wide panels were employed.

As with the structure of my aforementioned patent, in the embodiments illustrated herein the panels are defined by thin sheet metal stock of the type commonly employed for Venetian blind slats. Such panels may be generally flat, transversely curved, or rippled or corrugated in the fashion well known in the Venetian blind art. Additionally, decorative motifs may be applied to the respective panels to enhance their appearance such as, for example, by embossing or otherwise modifying the surface characteristics of the panels. Furthermore, if complete privacy is not desired or required, the panels may be provided with perforations arranged in decorative patterns. However, if imperforate panels are employed complete privacy is insured because edges of adjacent panels overlap slightly and vision through the hinge means is substantially obviated.

Figures 4, 5:
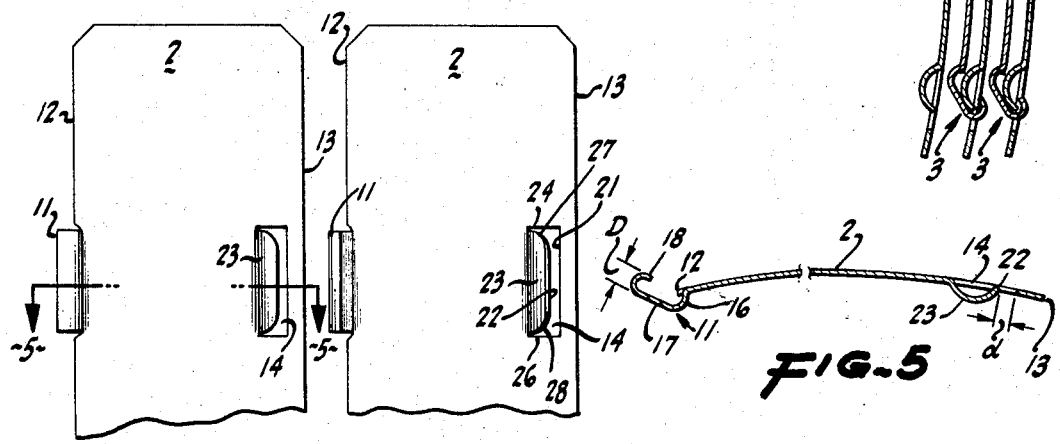
FIG. 4 is a partial plan view of two panels of this invention prior to hinged interconnection thereof.
FIG. 5 is a sectional view taken in the plane of line 5—5 of FIG. 4.

Referring now to FIGS. 4 through 6, the hinge means of a preferred embodiment of this invention will be described. In this connection, only part of two adjacent panels to be interconnected by the hinge means are shown in these figures but is should be understood as mentioned previously that the panels may take on any length desired and may include any required number of interengageable hinges. In this connection, in panel structures employing conventional Venetian blind slat stock, and for purposes of illustration only, it has been found that providing the hinges at six inch longitudinal intervals is suitable for most uses. In such construction, and with such spacing, hinges aproximately ¾" long are adequate to provide the results desired.

Each panel 2 of the structure includes a series of tongues provided along one edge 12 thereof which project transversely beyond such edge. Adjacent its other edge 13, the panel is provided with a corresponding number of elongated slots 14 spaced slightly inwardly from such edge. The tongues and slots on each panel are elongated in the longitudinal direction of the panel and the tongues and slots are of essentially the same length, with each tongue being only slightly shorter than a slot to permit passage thereof through the slot to be associated therewith.

Because the panel structure is foldable in accordion fashion, adjacent panels are oriented oppositely end-for-end to bring the tongues along one edge of one panel into proper alignment with the slots along the edge of an adjacent panel, as perhaps best seen in FIG. 2.

Each tongue 11 as seen in FIG. 5 is defined by a relatively abrupt bent shoulder portion 16 which extends generally laterally beyond and out of the plane of the edge 12 of its associated panel. A tongue body portion 17 then extends transversely from the shoulder portion to and beyond the edge 12 of the panel. The tongue body portion 17 is bent to cross the plane of the edge 12 of the panel and terminates in a curved marginal end portion 18 which is reversely bent to extend generally back toward the panel edge but stops short thereof. This reversely bent marginal end portion lies on the opposite side of the panel from the bent shoulder and it is such marginal end portion which provides the enlarged portion of the tongue which normally is precluded from passing through an associated slot 14.

Each slot 14 is generally rectangular in configuration and one longitudinal margin thereof, designated 21, is defined by a generally straight edge which extends generally parallel to the edge 13 of the panel. The opposite margin of the slot is defined by a marginal edge 22 of a resilient bendable tab 23 formed directly from the material of the panel 2. That is, the tab is struck from the panel and is connected directly therewith so as to be bendable relative to the plane of the panel as required during snap lock interconnection of adjacent panels.

Opposite longitudinal ends of the bendable tab are defined by spaced cuts, generally designated 24 and 26, extending into the panel from the open portion of the slot 14. The marginal edge 22 of the resilient tab is provided with rounded corners 27 and 28, as best seen in FIG. 4, which facilitate snap lock interconnection of a tongue beneath the resilient tab as will be described. As seen in FIG. 5, tab 23 is defined by a bent body portion which projects laterally out of the plane of the associated panel and then back into such plane so that the free marginal edge 22 thereof lies generally in such plane so as to be properly positioned for engagement with the enlarged end portion 18 of an associated tongue 11.

Referring now to FIGS. 10 through 12, assembly of two panels to effect a hinged interconnection therebetween may be effected simply and rapidly. As seen in FIG. 10, the first step in such assembly is to longitudinally align the tongues and slots of adjacent panels relative to each other. This is accomplished by positioning one panel to overlie and contact another panel to which it is to be interconnected. With the panels thus properly oriented with all tongues and slots aligned, it is merely necessary to slide the panels longitudinally relative to each other. Such movement engages the bent end portion 18 of each tongue beneath the resilient tab 23 which defines a margin of an associated slot. Such relative longitudinal movement between the two panels being interengaged results in temporary upward distortion of the resilient tab as seen in FIG. 13 to temporarily enlarge the slot 14. When the tongue has been completely received beneath the resilient tab, it snaps into the slot and hinged interconnection of the two panels is thereby completed.

In this regard, referring to FIGS. 4 and 5 it should be noted that the marginal end portion 18 of the tongue imparts a maximum dimension D to the tongue in a direction generally transverse to the axis of the panel. This dimension D is larger than the normal transverse dimension $d$ of the slot as seen in FIG. 4, which latter dimension is measured between the opposed margins 21 and 22 of the slot. Thus, the enlarged portion of the tongue normally cannot pass through the slot without distortion of the resilient tab.

While forcible insertion of the tongue into the slot in a lateral direction could be effected, the sliding snap lock interengagement just described is preferred for the illustrated embodiment. In this connection, such sliding snap lock interconnection is greatly facilitated by the rounded corners 27 and 28 provided on the marginal edge of each resilient tab. These rounded corners provide guide surfaces which permit the reversely bent portion 18 of a tongue to be engaged beneath the tab as the panels are slidably moved longitudinally relative to each other. In the absence of such rounded corners slidable insertion would be extremely difficult if not impossible to effect and some extraneous force to distort the tab from its normal position seen in FIG. 5 would be required. Thus, the tongue enlarged portion performs the function of temporarily distorting the associated resilient tab to enlarge the slot and thereafter maintains hinged interconnection therebetween.

Referring now to FIGS. 7 through 9, a modified embodiment of the hinge means is illustrated. In general respects this construction includes the same novel features of the embodiment just described but, due to its construction, the longitudinal sliding snap interlock mentioned is not obtainable. With the modified construction each panel is provided with a series of tongues 31 spaced as previously described along one edge 32 thereof. A corresponding series of slots 33 is spaced inwardly from the opposite edge 34 of the panel. One longitudinal margin 36 of each slot is defined by an edge which extends generally parallel to the edge 34 of the panel. A deformable resilient tab 37 having a generally straight margin 38 defines the opposite longitudinal margin of the slot. Tab 37 in this embodiment is defined at its opposite ends by spaced cuts 39 and 41 which extend from the slot into the body of the panel.

Each tongue 31 of this embodiment, as best seen in FIG. 8, has generally the same shoulder portion and body portion configuration as the tongues of the embodiment earlier described. However, the end portion of each tongue 31 is defined by rolling or bending the tongue generally back upon itself so that its roller margin provides an enlarged tongue portion 42, the dimension D of which in the transverse direction is greater than the normal maximum dimension $d$ of the slot 33. Thus, the enlarged portion 42 of the rolled tongue normally is not passable through the slot 33 unless the resilient tab 37 is deformed to temporarily enlarge such slot.

As seen in FIGS. 14 and 15 such temporary enlargement may be effected directly by the enlarged portion of the tongue. To this end, by positioning one panel generally over another panel but at a predetermined angle, such as 45 degrees, relative to the underlying panel, and by applying lateral pressure to the overlying panel, the enlarged portion 42 of the tongue may be urged through the slot upon generally lateral sliding movement of the two panels relative to each other. Enlarged portions of the tongues temporarily distort the resilient tabs 37 of associated slots as seen in FIG. 15 so that the enlarged portions may pass from one side of the panel to the other side thereof. Upon the enlarged portions passing through the slots the resilient tabs return to their normal position and thereafter preclude inadvertent separation of the tongues from the slots so that the panels are maintained hingedly interconnected.

Thus it should be understood that the tongues and slots of the modified construction described are snap interlockable but that such snap interlocking is effected by slidably moving panels to be interconnected laterally relative to each other rather than longitudinally of each other as described previously with the first embodiment disclosed herein. With either embodiment, however, the slots are temporarily enlarged by their associated tongues to permit enlarged portions of the associated tongues to pass therethrough from one side of a panel to the other. This, as noted previously, is in distinction to the bias insertion of the tongues through the slots of the structure of my aforementioned patent.

To build up a panel structure of a predetermined size with either of the hinge embodiments disclosed herein, it is merely necessary to similarly snap lock interengage the desired number of panels until a panel structure is built up having the desired dimensions. Such hinged interconnection may be effected by hand or by suitable apparatus, not disclosed herein. In this connection, the interconnection may be effected one panel at a time or a series of panels may be simultaneously interconnected, depending upon the apparatus and assembly method employed.

Referring now to FIGS. 16 through 19, the interlocking means for cooperable panel sections and the supporting means for the whole structure will be described.

As seen in FIG. 16, when in use the panel assembly 1 preferably is supported by means which include a decorative valance structure, generally designated 51. The valance structure, as perhaps best seen in FIGS. 18 and 19, comprises an elongated valance member 52 which preferably is formed in one piece as an aluminum or like metal extrusion. The valance member includes a flat top wall 53 which has a track 54 extending longitudinally thereof and depending therefrom. It is in such track that the aforementioned slide members 4 secured to the tops of predetermined panels of the assembly are engageable so that the panels may be slidably traversed the length of the valance as desired.

The valance member further includes a flat rear wall 56 having portions thereof projecting above and below the top wall. This rear wall terminates at its upper margin in an enlarged shoulder 57, which extends longitudinally of the valance and defines one corner thereof, and at its lower margin in an enlarged foot portion 58, which similarly extends longitudinally of the valance and defines a lower corner thereof. The valance further includes a front wall 59 having a configuration generally identical to that of rear wall 56. Front wall 59 similarly includes an upper enlarged shoulder portion 57 and a lower enlarged foot portion 58. The valance is thus imparted with generally an H-shaped symmetrical cross section so that either the wall 56 or 59 may be engaged with other components of the supporting means as will be described.

Each of the upper shoulder portions 57 of the valance includes a downwardly projecting lip 62, while each of the valance foot portions 58 includes an upwardly projecting lip 63. The lips 62 and 63 are spaced from their associated front or rear wall a predetermined distance and extend longitudinally of the valance generally parallel to their associated wall. These lips cooperate with each other in defining retaining slots which overlie the front and rear walls and are designated 64 and 66 respectively. It is in such retaining slot that a length of decorative facia material (not shown) corresponding to the material from which the panels are formed may be inserted to impart additional decorative characteristics to the valance.

The supporting means of the panel structure further includes bracket structure comprising a series of preformed metal brackets, generally designated 67, positioned in spaced relationship along the length of the valance as seen in FIG. 16. It is such brackets which support the valance. Each bracket is secured by screws 68, as seen in FIG. 18, to a supporting surface, such as the wall of a building or the upper portion of a window frame therein. Each bracket member includes a flat base portion 69 through which screws 68 extend into the supporting surface. The bracket also includes an upper channel portion 71 defined by a depending flange 72 and an inwardly directed lip 73 extending longitudinally of the bracket. The bracket further includes a lower channel portion 74 defined by an upwardly projecting flange 76.

It is in such upper and lower channel portions that the upper shoulder portion and lower foot portion of an associated valance are receivable in the fashion seen in FIG. 18. The valance is easily inserted into its associated brackets, and retained therein without requiring separate fasteners, in the manner shown in FIG. 19. In this connection, it should be understood that the height of the valance rear or front walls measured between the upper shoulder portion and the foot portion thereof is less than the internal height of the bracket member measured between the opposed bottoms of the bracket upper and lower channel portions, as is evident from FIG. 18.

Thus, to engage a valance with the brackets it is merely necessary to angularly orient the valance relative to each bracket previously secured to the supporting surface in a manner seen in FIG. 19 so that the upper shoulder portion of the valance wall may be inserted through and into the upper channel portion 71 of the bracket until an inwardly directed flange 80 of the shoulder portion clears the lip 73 of the bracket upper channel portion. Then by moving the valance upward until the shoulder portion strikes the bottom of the upper channel 71, the foot portion may be pivoted inwardly to clear the upwardly projecting lip 76 of the bracket lower channel portion, following which the valance may be allowed to move downwardly into the lower channel portion until the foot portion 58 of the valance engages the bottom of the lower channel portion 74.

As mentioned previously, the panel structure of this invention may comprise more than one discrete panel section. In such case, as seen in FIG. 16, it is preferred to provide means for interconnecting separate panel sections thereof, generally designated 81 and 82, to maintain the panel sections in their expanded condition as seen in FIG. 16. Such interconnecting means is generally designated 83 and comprises, as seen in FIG. 17, a handle 84 provided on the first panel of each panel section.

Preferably the handle employed on each panel section are identical in construction and therefore only one such handle will be described. In this regard, a preferred embodiment of each such handle comprises an elongated metal strip (preferably formed of the same material as the panels) which is preformed and extends the length of its associated panel. Such handle comprises a pair of spaced leg portions 86 and 87 which lie on opposite sides of the panel and straddle the edge thereof. Means for securing the handle to its associated panel may be provided and in this regard separate pins 88 may be provided to extend through the handle and its associated panel at suitable intervals along the length of the panel. Such pins may pass through the slots provided for the hinge means if desired. Alternatively, the handles themselves may be deformed into such slots so that separate securing pin are unnecessary.

Each handle is further provided along each of its opposite sides with a reversely bent hook portion 89 which generally overlies but is spaced laterally from its associated leg 86 or 87.

As seen in FIG. 17, when it is desired to maintain the cooperable panel sections 81 and 82 in their extended position when the first panels of each section are in a predetermined orientation, it is merely necessary to engage the hook portion 89 of one handle with the hook portion 89 of the other handle. This interengagement precludes separation of the panel sections so that movement of the sections to the retracted position is resisted positively.

In addition to serving this interconnection function, the handles on the respective panel sections provide enlarged grasping surfaces which facilitate handling of the panel structure and movement thereof between its expanded and retracted positions. It should also be understood that such handles are employable with the single section embodiment of the panel structure shown in FIG. 1, preferably on the first panel at each end of the structure, although a handle is shown at only one end thereof in FIG. 1.

The foregoing description is meant to be illustrative of this invention, rather than limiting thereof, and the scope of protection afforded hereto should be measured in light of the appended claims.

I claim:

1. An expansible and retractable accordion foldable panel structure, comprising
   (A) a plurality of elongated hingedly interconnected panels which are foldable in accordion fashion relative to each other when said structure is retracted or expanded, and
   (B) integral hinge means between adjacent panels of said structure comprising
      (1) at least one tongue provided along an edge of one of such adjacent panels, and
      (2) at least one slot provided along an edge of the other of such adjacent panels,
      (3) said tongue extending generally through said slot from one side to the other side of said other adjacent panel,
      (4) said slot being defined along one margin thereof by a deformable resilient tab integral with said other adjacent panel,
      (5) said tongue including an enlarged portion thereon which normally precludes passage of said tongue through said slot,
      (6) said resilient tab being deformable in response to engagement of said tongue therewith to permit temporary enlargement of said slot so that said enlarged portion of said tongue may be inserted through said slot from said one side to said other side of said other adjacent panel.

2. The panel structure of claim 1 in which said hinge means between said adjacent panels of said structure includes
   (7) a plurality of said tongues spaced along said edge of said one adjacent panel which are received in a corresponding number of said slots correspondingly spaced along said edge of said other adjacent panel.

3. The panel structure of claim 2 in which
   (8) each of said panels of said structure is substantially identical with all other panels,
   (9) adjacent panels of said structure being oppositely oriented end-to-end relative to each other to bring each tongue on one adjacent panel into alignment with a slot in the other adjacent panel.

4. The panel structure of claim 1 in which
   (7) said resilient tab defines one longitudinal margin of said slot and imparts a predetermined width to said slot in a direction transverse to the longitudinal axis of its associated panel,
   (8) said enlarged portion of said tongue imparting a maximum dimension to said tongue in a direction transverse to the longitudinal axis of its associated panel which exceeds said predetermined width of said slot,
   (9) the length of said tongue being slightly less than the length of said slot.

5. The panel structure of claim 1 in which
   (7) said tongue projects from said edge of said one adjacent panel,
   (8) said tongue enlarged portion being defined by a margin of said tongue which is reversely bent to extend generally toward said panel edge.

6. The panel structure of claim 1 in which
   (7) said resilient tab is formed to lie at least partially out of the plane of its associated panel so that a marginal portion of said tongue may be engaged therebeneath,
   (8) said resilient tab having rounded corners at said margin thereof,
   (9) said rounded corners facilitating sliding snap-lock interengagement of said tongue beneath said tab during insertion of said tongue enlarged portion through said slot as said adjacent panels are being hingedly interconnected.

7. The panel structure of claim 1 in which
   (7) said resilient tab lies substantially entirely in the plane of its associated panel,
   (8) said enlarged portion of said tongue being receivable in said slot upon said tab being temporarily moved out of the plane of said panel until said slot is enlarged sufficiently to permit said enlarged portion of said tongue to pass through said slot.

8. The panel structure of claim 1 in which
   (7) said tongue enlarged portion is generally laterally offset relative to its associated panel and is connected thereto by a relatively abrupt bent shoulder.

9. In an expansible panel structure,
   (A) hinge means interconnecting a pair of adjacent panels of said structure, comprising
      (1) at least one tongue provided along an edge of one such adjacent panel, and
      (2) at least one slot provided along an edge of the other such adjacent panel,
      (3) said tongue being received in said slot,
      (4) said slot being defined along one margin thereof by a deformable resilient tab integral with said other adjacent panel,
      (5) said tongue including an enlarged portion thereon which normally precludes passage of said tongue through said slot,
      (6) said resilient tab being deformable to permit temporary enlargement of said slot so that said enlarged portion of said tongue may be inserted generally beneath said tab through said slot from one side to the other side of said other adjacent panel.

10. The structure of claim 9 in which said hinge means includes
    (7) a plurality of said tongues spaced along said edge of said one adjacent panel which are received in a corresponding number of said slots correspondingly spaced along said edge of said other adjacent panel.

11. The hinge means of claim 10 in which
    (8) each of said tongues comprises
       (a) a bent shoulder portion extending generally laterally beyond the plane of the edge of its associated panel, (b) a body portion extending transversely from said shoulder portion to and beyond the edge of such panel and crossing the plane thereof, and (c) a reversely bent marginal end portion extending generally back toward said panel edge, and in which (9) each of said resilient tabs comprises (a) a bent body portion which projects laterally out of the plane of its associated panel and then back into such plane so that the free margin of said tab lies generally in such plane, (b) opposite corners of said tab margin being rounded and providing guide surfaces which facilitate sliding interengagement of a marginal end portion of a tongue beneath such tab during sliding snap lock interconnection of said panels.

12. The hinge means of claim 10 in which (8) each of said tongues comprises (a) a bent shoulder portion extending generally laterally beyond the plane of the edge of its associated panel, (b) a body portion extending transversely from said shoulder portion to and beyond the edge of such panel and crossing the plane thereof, and (c) a reversely bent marginal end portion extending generally back toward said panel edge, and in which (9) each of said resilient tabs comprises (a) a body portion which lies generally entirely within the plane of its associated panel and is temporarily deformable out of such plane in response to engagement of said tongue enlarged portion therewith to permit snap lock interconnection of said panels.

13. The structure of claim 10 in which (8) each of said slots is enclosed by its associated panel and is spaced slightly inwardly from said edge thereof.

14. The structure of claim 9 in which (7) each of said panels has at least one such tongue along one edge thereof and at least one such slot along the other edge thereof.

15. A method of assembling an expansible and retractable panel structure which comprises, the steps of (A) providing a supply of panels, each of said panels including (1) opposite longitudinal edges, (2) at least one elongated tongue provided along one edge thereof, (3) such tongue having an enlarged portion thereon which imparts a maximum dimension thereto in one direction, (4) at least one elongated slot provided along the other edge thereof, (5) such slot being defined along one margin thereof by a resilient tab which is integral with such panel, (6) the normal maximum dimension of such slot in a direction generally corresponding to the maximum dimension imparted to said tongue by said enlarged portion thereof being less than said tongue maximum dimension so that insertion of said tongue enlarged portion through said slot normally is precluded by said resilient tab, (B) positioning one such panel generally over another such panel with each tongue of one panel aligned with a slot of the other panel, (C) distorting the resilient tab in said slot to thereby enlarge said slot temporarily, (D) while said slot is enlarged inserting said enlarged portion of said tongue through said slot from one side of its associated panel to the other, (E) and similarly interengaging the tongues and slots of other panels until a panel structure of a desired size has been assembled from said supply.

16. A method of assembling an expansible and retractable panel structure which comprises, the steps of (A) providing a plurality of panels, each of said panels including (1) opposite longitudinal edges, (2) a plurality of elongated spaced tongues provided along one edge thereof, (3) each said tongue having an enlarged portion thereon which imparts a maximum dimension thereto in a direction generally transverse of said panel edges, (4) a corresponding number of elongated spaced slots provided along the other edge thereof, (5) each said slot being defined along one margin thereof by a resilient tab which is integral with such panel, (6) the normal maximum dimension of each such slot in a direction transverse to said panel edges being less than said tongue maximum dimension so that insertion of said tongue enlarged portion through said slot normally is precluded by said resilient tab, (B) arranging a pair of said panels one generally over the other with the tongues of one panel aligned with the slots of the other panel, (C) distorting the resilient tabs on one panel to thereby enlarge the slots thereof temporarily by engaging said enlarged portions of said tongues with said tabs to force such enlarged portions through said slots from one side to the other of such one panel, (D) and similarly interengaging the tongues and slots of other panels until a panel structure of a desired size has been assembled.

17. The method of claim 16 in which (E) said tongues are laterally aligned with said slots prior to distortion of said resilient tabs to enlarge said slots, (F) said tongues being snap lock interengaged with said slots by moving said panels laterally relative to each other until said tongue enlarged portions have passed through said slots.

18. The method of claim 16 in which (E) said tongues are longitudinally aligned with said slots prior to distortion of said resilient tabs to enlarge said slots, (F) said tongues being slidably snap lock interengaged with said slots by moving said panels longitudinally relative to each other until a marginal end portion of each tongue is fully engaged beneath a resilient tab of an associated slot and passes through such slot.

References Cited

UNITED STATES PATENTS

| | | | |
|---|---|---|---|
| 453,743 | 6/1891 | Heller | 52—522 |
| 1,819,377 | 8/1931 | Nelson | 52—526 |
| 2,078,998 | 5/1937 | Black | 52—526 |
| 2,374,395 | 4/1945 | Thoele | 129—1 |
| 2,733,830 | 2/1956 | Ruskin | 220—31 |
| 3,196,931 | 7/1965 | Toti | 160—183 |

DAVID J. WILLIAMOWSKY, *Primary Examiner.*

PETER M. CAUN, *Examiner.*